US011405079B2

(12) United States Patent
Yu et al.

(10) Patent No.: US 11,405,079 B2
(45) Date of Patent: Aug. 2, 2022

(54) TECHNIQUES FOR ACQUISITION OF CHANNEL STATE INFORMATION

(71) Applicant: Intel Corporation, Santa Clara, CA (US)

(72) Inventors: Zhibin Yu, Unterhaching (DE); Ziyang Ju, Munich (DE); Michael Ruder, Pommelsbrunn (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/251,222

(22) PCT Filed: Aug. 8, 2019

(86) PCT No.: PCT/EP2019/071366
§ 371 (c)(1),
(2) Date: Dec. 11, 2020

(87) PCT Pub. No.: WO2020/052871
PCT Pub. Date: Mar. 19, 2020

(65) Prior Publication Data
US 2021/0250069 A1 Aug. 12, 2021

(30) Foreign Application Priority Data

Sep. 10, 2018 (EP) .................... 18193476

(51) Int. Cl.
*H04B 7/06* (2006.01)
*H04B 7/0456* (2017.01)
(Continued)

(52) U.S. Cl.
CPC ........... *H04B 7/0486* (2013.01); *H04B 7/063* (2013.01); *H04B 7/0626* (2013.01);
(Continued)

(58) Field of Classification Search
CPC .... H04B 7/0486; H04B 7/0626; H04B 7/063; H04B 7/0632; H04B 7/0639; H04B 7/0658; H04B 17/336; H04W 8/24
See application file for complete search history.

(56) References Cited

U.S. PATENT DOCUMENTS

2017/0264349 A1* 9/2017 Kant ................. H04W 52/0212

FOREIGN PATENT DOCUMENTS

EP 2547022 A1 1/2013
WO 2016082869 A1 6/2016

OTHER PUBLICATIONS

International Search Report based on application No. PCT/EP2019/071366 (14 pages) dated Sep. 13, 2019 (For reference purpose only).

* cited by examiner

*Primary Examiner* — Minh Trang T Nguyen
(74) *Attorney, Agent, or Firm* — Viering, Jentschura & PartnerMBB (57) ABSTRACT

This disclosure relates to a channel state information, CSI, acquisition circuitry, configured to: determine at least one channel covariance matrix estimate and interference-and-noise covariance matrix estimate based on at least one channel state information reference signal, CSI-RS, resource; select a restricted number of rank indicator, RI, hypotheses from a set of RI hypotheses for running a joint rank indicator-precoding matrix indicator, RI-PMI, search on the CSI-RS based channel covariance matrix estimate and interference-and-noise covariance matrix estimate to select an optimal RI value and associated PMI value, wherein the restricted number of RI hypotheses is in accordance with a run-time estimated CSI acquisition capability
(Continued)

of the CSI acquisition circuitry; and execute the joint RI-PMI search based on the selected RI hypotheses.

18 Claims, 4 Drawing Sheets

(51) Int. Cl.
*H04B 17/336* (2015.01)
*H04W 8/24* (2009.01)
(52) U.S. Cl.
CPC ......... *H04B 7/0632* (2013.01); *H04B 7/0639* (2013.01); *H04B 7/0658* (2013.01); *H04B 17/336* (2015.01); *H04W 8/24* (2013.01)

TECHNIQUES FOR ACQUISITION OF CHANNEL STATE INFORMATION

CROSS-REFERENCE TO RELATED APPLICATIONS

This application is a national stage entry under 35 U.S.C. § 371 of PCT/EP2019/071366 filed on Aug. 8, 2019, which claims priority to European Application No. 18 193 476.1 filed on Sep. 10, 2018, the contents of which are both incorporated by reference their entirety.

FIELD

The disclosure relates to techniques for acquisition of channel state information (CSI), in particular to a CSI acquisition circuitry, a baseband processor and a method for CSI acquisition. The disclosure particularly relates to techniques of adaptive and hierarchical CSI acquisition for 5G NR (New Radio) UE (User Equipment) computation complexity reduction.

BACKGROUND

Channel State Information (CSI) acquisition is one of the key algorithm kernels contributing to User Equipment (UE) Downlink (DL) throughput performance in Long Term Evolution (LTE) and 5G New Radio (NR). The major task of CSI acquisition is to find the optimal combination of Rank Indicator (RI) and Precoding Matrix Indicator (PMI), measure the Channel Quality Indicator (CQI) associated to the optimal RI-PMI combination, and report all of them to the base station (gNB), so as to enable the base station to adapt optimally to the link quality. For 5G NR, CSI acquisition is based on Channel State Information Reference Signal (CSI-RS) resources. The optimal search for RI and PMI is based on Mutual Information (MI) measurements, obtained from all hypothesized RI-PMI combinations applied on the channel co-variance matrix estimates based on the received CSI-RS resource. Unlike LTE where UE can still run brute-force full joint RI and PMI search with full RI hypotheses, UE full search is no longer possible for 5G NR CSI acquisition.

BRIEF DESCRIPTION OF THE DRAWINGS

The accompanying drawings are included to provide a further understanding of aspects and are incorporated in and constitute a part of this specification. The drawings illustrate aspects and together with the description serve to explain principles of aspects. Other aspects and many of the intended advantages of aspects will be readily appreciated as they become better understood by reference to the following detailed description.

DETAILED DESCRIPTION

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

The following terms, abbreviations and notations will be used herein:
5G NR: 3GPP fifth generation new radio specifications
UE: User Equipment
LTE: Long Term Evolution
mmWave: millimeter-wave
CSI: Channel State Information
RI: Rank Indicator
PMI: Precoding Matrix Indicator
MI: Mutual Information
CQI: Channel Quality Indicator
CSI-RS: Channel state information reference signal
OFDM: orthogonal frequency division multiplex
gNB: base station according to 5G NR terminology
UCI: uplink control information
PDSCH Physical Downlink Shared Channel
DMRS: Demodulation Reference Signal
RB: Resource Block
RE: Resource Element
SINR: Signal-to-interference plus noise
QCL: Quasi Co-location
EVD: Eigenvalue Decomposition
CC: Component Carrier
DL: Downlink
RSRQ: Reference Signal Received Quality
SSB: Synchronization Signal Block
CSI-acquisition:
  based on channel and noise observation from a CSI-RS resource, to detect the optimal RI and PMI combination associated to that CSI-RS resource.
CSI acquisition capability:
  The number of RI hypotheses and the associated PMI hypotheses that can be tested by joint RI-PMI search within a pre-defined time window.

It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary aspects described herein may be combined with each other, unless specifically noted otherwise.

The techniques described herein may be implemented in wireless communication networks, in particular communication networks based on mobile communication standards such as 5G new radio (NR), in particular for millimeter-wave data rate. The techniques may also be applied in LTE networks, in particular LTE-A and/or OFDM and successor standards. The methods are also applicable for high speed communication standards from the 802.11 family according to the WiFi alliance, e.g. 802.11ad and successor standards. The methods and devices described below may be implemented in electronic devices such as cellular handsets and mobile or wireless devices or User Equipment communicating with access points and/or base stations. The described devices may include integrated circuits and/or passives and may be manufactured according to various technologies. For example, the circuits may be designed as logic integrated circuits, ASICs, analog integrated circuits, mixed signal integrated circuits, optical circuits, memory circuits and/or integrated passives.

To cope with time-varying fading variations of the wireless channels, the transmitter (Tx) usually uses feedback channels to report current channel state information (CSI) and adjusts transmit parameters such as modulation, code rate, spatial layer, and adopted precoding matrix. CSI can be acquired at the Tx in terms of three primary parameters, i.e., rank indicator (RI), precoding matrix indicator (PMI), and channel quality indicator (CQI). These parameters can help the Tx to dynamically select the appropriate parameters for the signals to achieve better and reliable transmission.

Among the various pieces of feedback information, the precoding matrix serves to appropriately distribute the layered data streams transmitted by the multiple Tx antennas. Different precoding matrix selections will dramatically influence system capacity and system bit error rate (BER) performance. The precoding matrix determines how the individual data streams (also referred to as layers) are mapped to the antennas. Skillfully selecting this matrix yields a maximum number of data bits, which the UE can receive together across all layers. However, this requires knowledge of the channel quality for each antenna in the downlink, which the UE can determine through measurements. If the UE knows what the allowed precoding matrices are, it can send a PMI report to the BS and suggest a suitable matrix.

The channel rank indicates the number of layers and the number of different signal streams transmitted in the downlink. When using a single input multiple output (SIMO) or a transmit diversity configuration, only one layer is utilized. In contrast, 2×2 MIMO (multiple input multiple output) with spatial multiplexing uses two layers. The goal of an optimized RI is to maximize the channel capacity across the entire available downlink bandwidth by taking advantage of each full channel rank.

Methods, devices and systems as described in the following are based on joint RI-PMI search. In the following, an exemplary joint RI-PMI search that is based on eigenvalue decomposition (EVD) is described. The received signal vectors $y_k$ at the $k^{th}$ subcarriers of the OFDM signal can be expressed as follows:

$$y_k = H_k W_i x_k + n_k$$

where $H_k$ is the MIMO channel matrix; $W_i$ is the precoding matrix to be determined; $x_k$ is the transmitted signal vector, and $n_k$ is the additive white Gaussian noise.

In an exemplary implementation of the RI-PMI search procedure, the appropriate PMI can be selected based on singular value decomposition (SVD), e.g. as described in the following: Let the SVD of the channel matrix be:

$$H = U D V^H,$$

where U and V are the unitary matrices of dimensions $N_r \times N_r$ and $N_t \times N_t$, respectively, where $N_r$ is the number of receive antennas and $N_t$ is the number of transmit antennas. D is a diagonal matrix. Let the characteristic of the equalizer at Rx be $G_k = U^H$, and let the precoding matrix at Tx be $W_i = V$. Then, the receive signal can be expressed as follows:

$$Y = U^H H W_i X = U^H U D V^H V X = D X.$$

X is the transmitted signal. Define an equivalent channel (EC) as follows:

$$P_{(Wi)} = U^H H W_i = D V^H W_i$$

Then, the suitable PMI for this method can be determined as the maximum argument of the absolute value of the function $$\sum_{j=1}^{L} P_{(Wi)}(j,j)$$

with respect to $W_i$, where L is the number of spatial layers and (i,j) corresponds to diagonal elements of the matrix. Basically, the method tries to find a precoding matrix that can achieve the best equivalent channel gain during the ongoing MIMO transmission.

The PDSCH rank indication (RI) selection process, also denoted as PMI-RI search, determines the optimal number of layers (NLayers) to use for transmission to maximize SINR. The range of NLayers to consider is calculated based on the transmission scheme and the configured reference signal ports. In the following an exemplary RI-PMI search algorithm is described for RI and PMI selection.

1. For v=1, . . . , NLayers:
   Perform PMI Selection with chs.NLayers=v.
   PDSCH precoder matrix indication (PMI) selection calculates a PMI set, pmiset. PMI selection is performed using the PMI definitions specified in TS 36.213, Section 7.2.4.
   Record the selected PMI and total SINR across all layers, excluding layers with SINR below the threshold of 0 dB.
2. Select the number of transmission layers, v, that maximizes the SINR of the transmission and return as the rank indication, ri and corresponding PMI set, pmiset.

Figure 1:
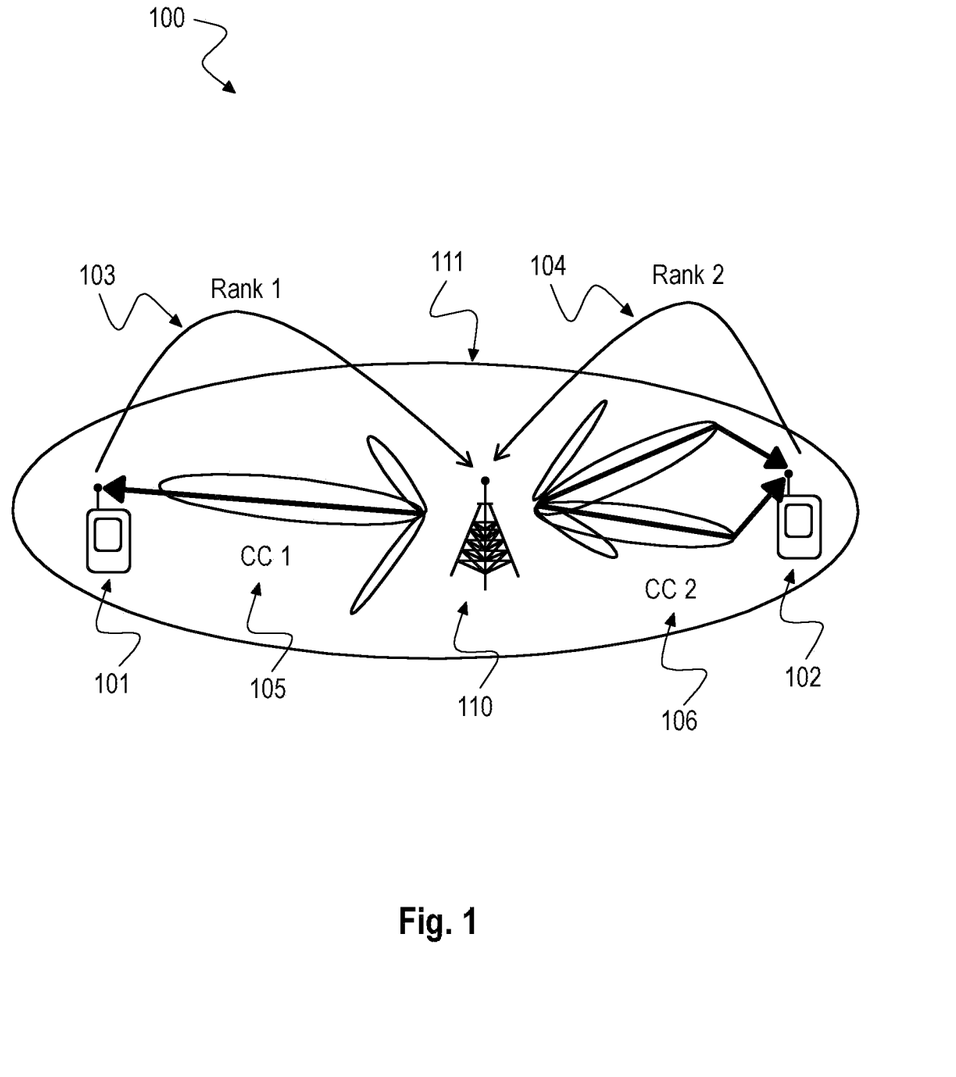
FIG. 1 is a schematic diagram illustrating a 5G NR mmWave communications system 100 where UEs (User Equipments) 101, 102 report their CSI acquisitions 103, 104 to a gNB (or base station) 110.

In the 5G NR mmWave communications system 100 of FIG. 1 UEs (User Equipments) 101, 102 report their CSI acquisitions 103, 104 to a gNB (or base station) 110. In the exemplary configuration shown in FIG. 1, a first UE 101 to which a first beam on component carrier 1, 105 is directed measures rank 1 (RI=1) while a second UE 102 to which a first and a second beam on component carrier 2, 106 are directed measures, rank 2 (RI=2). Each UE 101, 102 reports the acquired CSI to the gNB (base station) 110.

Both UEs 101, 102 apply CSI acquisition to find the optimal combination of Rank Indicator (RI) and Precoding Matrix Indicator (PMI), measure the Channel Quality Indicator (CQI) associated to the optimal RI-PMI combination, and report all of them to the base station (gNB) 110, so as to enable the base station 110 to adapt optimally to the link quality. For 5G NR, CSI acquisition is based on Channel State Information Reference Signal (CSI-RS) resources. The optimal search for RI and PMI is based on Mutual Information (MI) measurements, obtained from all hypothesized RI-PMI combinations applied on the channel co-variance matrix estimates based on the received CSI-RS resource. Comparing with LTE, in 5G NR, UE computation complexity for CSI acquisition is significantly increased due to the following reasons:

1) The worst-case system bandwidth in 5G NR is much higher than that in LTE (worst case 275 resource blocks in NR comparing with worst case 100 resource blocks in LTE). This increases the computation complexity to generate the CSI-RS based co-variance matrix in worst case resource configurations.

2) The number of PMI hypotheses is significantly higher than that in LTE, mainly due to massive digital beam candidates (each associated to a digital code-word) to be formed from gNB transmitter side in 5G NR. The NR type I multi-panel codebook has a huge set, which contains up to 65536 PMI candidates due to the introduction of inter-panel co-phasing elements. For the LTE non-FD-MIMO case, the max number of PMI candidates is only 256, and even with FD-MIMO it is increased to 2048, which is a much smaller set compared with 5G NR.

3) The time duration where a UE must finish the CSI acquisition is much shorter than that in LTE, mainly due to shorter slot length (e.g. NR 60 kHz sub-carrier spacing (SCS) results in a ¼ slot length comparing with LTE 15 kHz SCS) as well as the combination with reduced reporting latency requirement (worst case 1 slot latency 'n+1' in 5G NR comparing with constant 4 sub-frames latency 'n+4' in LTE).

4) The number of CSI reports triggered by gNB increases with the number of DL Components Carriers (CCs), which has been further increased in 5G NR. For example, LTE eCA supports up to 8 CCs and one CSI report could be triggered for each CC in parallel without considering DL CoMP (no deployment so far from the network side), while 5G NR UE needs to support up to 48 parallel CSI report updates at the same time for all CCs.

Based on above reasons, unlike LTE where UE 101, 102 can still run brute-force full joint RI and PMI search with full RI hypotheses, UE full search is no longer possible for 5G NR CSI acquisition. The disclosure describes new techniques how to maintain good CSI acquisition performance without significantly boosting up the UE hardware cost nor UE power consumption.

A basic concept of the disclosed techniques for CSI acquisition is the following: The basic concept is to use an adaptive multi-stage CSI acquisition scheme with hierarchical search granularities. The search granularities can be flexibly adjusted due to soft-decisions instead of hard-decisions in-between the search stages and can be adapted to dynamic wireless channel conditions or dynamic communication scenarios to further reduce the complexity. The disclosed solution includes the following sub-methods:

Sub-method 1 is a channel adaptive down-sampling method to dynamically down-sample the CSI-RS Resource Elements (REs) in frequency domain before computing the CSI-RS channel co-variance matrix. The down-sampling ratio is adapted to delay spread estimation: E.g. for low frequency selective channels (indicated by short delay spread) more aggressive down-sampling can be applied (with less REs and therefore reduced complexity); while for high frequency selective channels (indicated by long delay spread) less down-sampling can be applied (with more REs). The delay spread information can be derived by directly measuring the CSI-RS resource, or alternatively, derived from the measurement of PDSCH DMRS (Physical Downlink Shared Channel Demodulation Reference Signal), or PDCCH DMRS (Physical Downlink Control Channel Demodulation Reference Signal), or tracking reference signal (TRS), or another CSI-RS resource, which is quasi co-located (QCLed) with the CSI-RS resource. The frequency domain down-sampling of CSI-RS resource elements in this stage can relax the computation budge (also denoted hereinafter as CSI acquisition capability) requirement, so that more RI-PMI hypotheses can be tested in the later-on joint search stage.

Sub-method 2 is a pre-filtering stage that eliminates unrealistic RI hypotheses based on signal-to-interferer-and-noise ratio (SINR) measurement of CSI-RS resource. That is because in very low SINR conditions, very high order of MIMO communication with reasonable DL BLER is no longer possible.

Sub-method 3 is a follow-up EVD operation that can be applied on the derived CSI-RS channel co-variance matrix. However, a soft-decision (in form of confidence metric) instead of hard-decision is generated per RI hypothesis. In one exemplary implementation, the RI confidence metric can be determined by Euclidean distances between the normalized eigenvalues obtained from EVD, and the ideally optimal eigenvalues associated to a RI hypothesis. The confidence metric can be further soft-combined with other pre-estimated channel qualities, e.g. SINR.

Sub-method 4 is to sort and further down-select the RI hypotheses for generating the CSI reports for all DL CCs which need to apply CSI acquisitions at the same time. The sorting can be based on RI confidence metrics as well as CC priority. The down-selection can be done such that more RI hypotheses can be selected for high priority CCs (e.g. PCell or CCs with less loaded users, indicated by RSRQ measurement, or CCs which have higher DL system bandwidth). In the extreme case, this can fall back to joint RI-PMI search with full RI hypotheses on that CC. And this will result in the best CSI acquisition performance in that high priority CC. Meanwhile, less RI hypotheses can be selected for low priority CCs. In an extreme case, this can fall back to decoupled RI and PMI search by selecting the RI hypothesis with the highest confident metric, which will result in sub-optimal CSI acquisition performance on that low priority CC.

Sub-method 5 is to apply RI-PMI search for the finally down-selected RI hypothesis for CSI reports for all CCs.

Multiple-stage CSI acquisition with scalable complexity adapted to channel conditions and report priorities as described hereinafter provides lower computation complexity comparing with full RI-PMI search. The disclosed techniques provide better performance than EVD only based approach because RI and PMI are still jointly considered (joint RI-PMI search is applied on the high confident RI hypothesis).

In the following, aspects are described with reference to the drawings, wherein like reference numerals are generally utilized to refer to like elements throughout. In the following description, for purposes of explanation, numerous specific details are set forth in order to provide a thorough understanding of one or more aspects of aspects. However, it may be evident to a person skilled in the art that one or more aspects of the aspects may be practiced with a lesser degree of these specific details. The following description is therefore not to be taken in a limiting sense.

The various aspects summarized may be embodied in various forms. The following description shows by way of illustration various combinations and configurations in which the aspects may be practiced. It is understood that the described aspects and/or aspects are merely examples, and that other aspects and/or aspects may be utilized and structural and functional modifications may be made without departing from the scope of the present disclosure.

Figure 2:
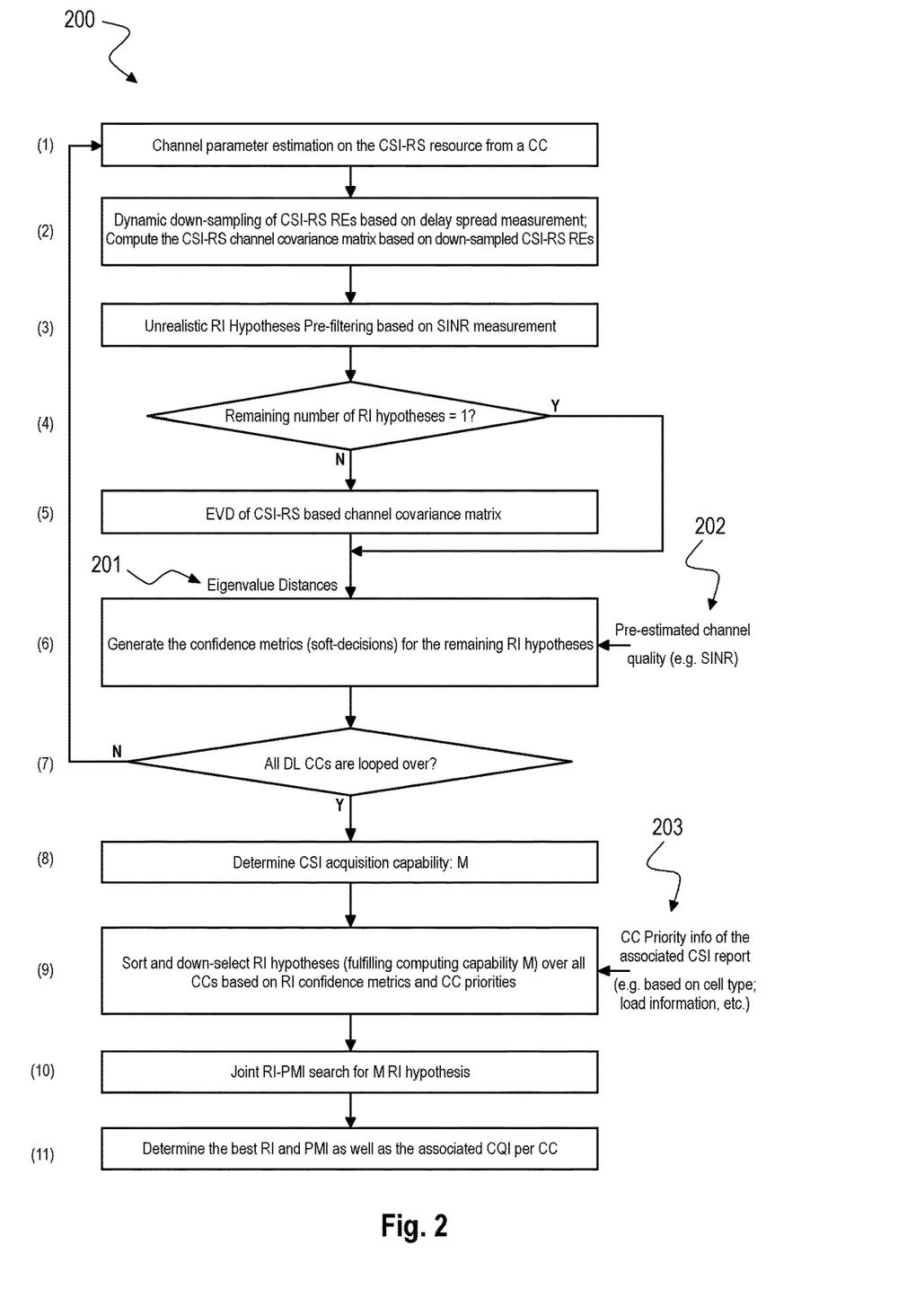
FIG. 2 is a schematic diagram illustrating an example procedure 200 of an adaptive and hierarchical CSI acquisition scheme according to the disclosure.

FIG. 2 is a schematic diagram illustrating an example procedure 200 of an adaptive and hierarchical CSI acquisition scheme according to the disclosure.

A multi-stage CSI acquisition scheme with hierarchical search granularities is presented in FIG. 2. The search granularities can be adapted to pre-estimated channel parameters. An adaptive down-sampling step (2) of CSI-RS REs can be applied when computing the CSI-RS channel co-variance matrix, while the down-sampling ratio may be dynamically determined based on the observation of channel frequency selectivity (e.g. indicated by delay spread measurement). A pre-selection step (3) can be applied to eliminate unrealistic RI hypotheses based on SINR measurement. Soft-decisions (in form of RI confidence metrics) (6) instead of hard-decisions can be made on reduced RI hypotheses for the PMI search after the pre-selection. A sorting operation (9) can further down-select only high confident RI hypotheses in high priority CCs. The CC priority 203 can be based on CC types (e.g. PCell) or based on the load information (number of other UEs served by a same gNB in the same CC) in that CC (can be indicated by serving cell RSRQ measurement): better CSI acquisition performance may be more desired on less loaded CCs (and therefore higher priority) because higher DL throughput can be scheduled from the base station to the UE in those CCs. Then, joint RI-PMI search (10) can be applied only on the down-selected RI hypotheses to find the optimal RI-PMI combination. In the following, a detailed description of each step in FIG. 2 is provided.

In step (1), one CSI-RS resource from one CC is selected and the channel parameters associated to that resource are estimated (e.g. SINR estimation, delay spread estimation). The channel parameter estimation can be derived by directly measuring the CSI-RS resource. As an alternative, the channel parameter estimation can be derived by measuring the PDSCH DMRS which is QCLed with the CSI-RS resource. In the latter case, it does not introduce extra DSP computation load because channel parameters like delay spread can be reused from DMRS channel estimation processing. Further note that the computation complexity for channel parameter estimation is much lower than the subsequent CSI—acquisition processing (e.g. channel co-variance computation, EVD computation, joint RI-PMI search).

In step (2), an adaptive down-sampling of CSI-RS resource can be applied. The down-sampling can be applied on the resource blocks (RBs) which contain CSI-RS REs. Each down-sampled RB will generate a CSI-RS co-variance matrix. The down-sampling ratio can be determined by the delay spread estimation. That is because for low frequency selective channels (indicated by low delay spread estimation), CSI-RS REs with lower density are sufficient to reflect the channel information for CSI-acquisition. In this case, an aggressive down-sampling of CSI-RS REs can significantly reduce the computation complexity for CSI-RS based channel co-variance matrix generation (as well as later on EVD and joint RI-PMI search) because the processing load scales with the number of down-sampled CSI-RS REs. The saved computation load by step (2) can provide more budget to search more RI/PMI hypotheses in step (10).

In step (3), a pre-filtering can be done to eliminate unrealistic RI hypotheses. The pre-filtering can be based on the SINR estimation. That is because in very low SINR conditions, very high order of MIMO communication is no longer possible. As one example, when SINR is below −3 dB, only rank is realistic while all other rank hypotheses can be immediately ruled out as they would result in high BLER. As another example, when SINR is below +15 dB, hypotheses of rank 4 can be immediately ruled out as UE cannot sustain 4 MIMO layers with a reasonable BLER. This already results in a reduced RI search space. Step (4) checks whether the remaining RI hypotheses after pre-filtering is already 1 or not. If yes, the procedure directly jumps to step (6) because the RI is already determined and EVD processing in step (5) can be skipped. The saved computation load by skipping step (5) can provide more budget to search more RI/PMI hypotheses in step (10). Otherwise, the procedure goes to step (5). Note that, as a further extension, in some extreme cases the EVD can be of higher computation complexity than the full RI/PMI search due to a reduced number of PMI candidates (e.g. a significant reduced PMI search space by a-priori information about gNB TX beams). In this case the EVD may also be skipped.

In step (5), EVD can be applied on each co-variance matrix per active RB (resource block) and the derived eigenvalues are combined over the RBs. In step (6), instead of making the hard-decision on the RI value based on thresholds over eigenvalues for the rank estimation, soft-decision can be generated which maps the normalized eigenvalues into a confidence metric for each RI hypothesis. As one example, the RI confidence metric can be determined by Euclidean distances between the normalized eigenvalues obtained from EVD, and the theoretical optimal eigenvalues associated to a RI hypothesis.

The approach of soft-decision generation is described below: First, the narrow-band eigenvalues are estimated by EVD operations within each down-sampled CSI-RS RB. And then, narrow-band eigenvalues from down-sampled CSI-RS RBs are combined, normalized, and sorted, so as to generate a vector of estimated wide-band eigenvalues, which are represented in the following form:

$$\hat{\lambda} = [\hat{\lambda}_1, \hat{\lambda}_2, \ldots, \hat{\lambda}_Q] \quad (1)$$

where $0 \leq \hat{\lambda}_Q \leq \ldots \leq \hat{\lambda}_1 \leq 1$, $\sum_{p=1}^{Q} \hat{\lambda}_p = 1$ and Q is the minimum value between the number of UE RX antenna ports and the number of gNB CSI-RS antenna ports.

For each RI hypothesis with the rank value r ($1 \leq r \leq Q$), the theoretical optimal eigenvalues associated to rank r can be presented by the following form:

$$\check{\lambda}_r = [\check{\lambda}_{r,1}, \check{\lambda}_{r,2}, \ldots, \check{\lambda}_{r,Q}] \quad (2)$$

$$\text{where } \check{\lambda}_{r,p} = \begin{cases} 1/r, & p \leq r \\ 0, & \text{otherwise} \end{cases}$$

For each RI hypothesis $\tilde{r} \in \{1, \ldots, Q\}$, a soft metric can then be computed as the Euclidean distance between $\hat{\lambda}$ and $\check{\lambda}_{\tilde{r}}$ in the following form:

$$m_{\tilde{r}} = \|\hat{\lambda} - \check{\lambda}_{\tilde{r}}\| = \sqrt{\sum_{p=1}^{Q} (\hat{\lambda}_p - \check{\lambda}_{\tilde{r},p})^2} \quad (3)$$

The metric computed by formula (3) shows the confidence level of an RI hypothesis $\tilde{r}$: the lower the value of $m_{\tilde{r}}$, the closer the estimated eigenvalues are comparing with the ideal optimal eigenvalues associated to that RI hypothesis. Therefore, $m_{\tilde{r}}$ can be used as a soft metric to judge the confidence for each RI hypothesis $\tilde{r}$. The confidence metric can be further combined with additional parameter estimates which are not covered by EVD (e.g. SINR estimations from step (1) in FIG. 2). As further extension, additional tuning of confidence metrics is possible so as to adapt the rank preference to different transmission modes or scenarios. That can be done by applying a weight factor on the confidence metric generated by formula (3) or by adapting the theoretical optimal eigenvalues in formula (2).

In FIG. 2, Step (1) to step (6) are repeated for the CSI-RS resources among all DL CCs as controlled in step (7).

In step (8), the remaining computation budget after the coarse search from step (1) to step (6) for all CCs is derived. Here, M is the total number of RI hypotheses that the remaining computation budget can support for joint RI-PMI search. Note that, as a further extension, computation budget benchmarking in finer granularities can also be explored. As one example, M can also reflect the remaining operations that can still be real-time processed for the remaining joint RI-PMI search. And for each CSI-RS resource, the required operation is a function mapped by: the number of down-sampled CSI-RS REs, the number of RI hypotheses to test, and the number of PMI hypotheses to compute per RI hypothesis.

In step (9), a sorting and further down-selection can be applied on the RI hypotheses over all CCs. It results in a reduction of the RI hypotheses until the remaining computation budget M can be fulfilled for the CSI-RS resources from all CCs. As one example, the sorting & down-selection can be done such that more RI hypotheses can be selected for high priority CCs. In an extreme case it falls back to joint RI-PMI search with full RI hypotheses on that CC, and it will have best CSI acquisition performance in that high priority CC; as another example, less RI hypotheses can be selected from low priority CCs. In another extreme case it falls back to decoupled RI and PMI search by selecting the RI hypothesis with the highest confident metric which will result in sub-optimal CSI acquisition performance on that low-priority CC.

In step (9), the CC priority can be based on CC types (e.g. PCells, i.e. primary cells can have higher priority than SCells, i.e. secondary cells). The CC priority can also be based on the load conditions (indicated by RSRQ measurement on UE side) in that CC. The reason why less loaded (with less number of users served by a same gNB) CCs can have higher priority to achieve better CSI acquisition performance is that, higher DL throughput can be scheduled from the base station to the UE in less loaded CCs. Alternatively, the CSI priority can be also determined by using the UCI (uplink control information) priority rules defined by 3GPP in the NR spec (TS 38.214, 5.2.5), where each resource has one priority value. Note that those rules are defined with the purpose of dropping low priority CSI reports in case the total UCI payloads exceeds the reporting capability of the associated PUCCH. The alternative implementation here is to "re-use" such priority to prioritize the CSI performance in different CCs.

In step (10), the joint RI-PMI search is applied on the finally down-selected RI hypotheses for CSI-RS resources from all CCs. Note that the disclosed method in this disclosure is fully compatible with any additional multi-stage PMI search schemes. In step (11), the best RI-PMI combination is detected after the joint search and the associated CQI is measured to generate the CSI feedback report for each CC.

Note that in the example of FIG. 2, only one CSI-RS resource is used for CSI-acquisition (RI/PMI/CQI) per CC. That assumes in case there are multiple CSI-RS resources allocated per CC, the best CSI-RS resource is already selected through intra-CC CRI (CSI-RS resource index) selection procedure (e.g. by selecting the CSI-RS resource with the best received power) as a decoupled step. As a further extension, intra-CC CRI selection can be combined into the search procedure in FIG. 2. As a result, instead of relying on simplified received power to identify the best CSI-RS resource per CC, soft-decisions e.g. RI confidence metrics can be generated over multiple candidate CSI-RS resources per CC and jointly sorted in step (10) to derive the best RI and PMI in step (11). This allows advanced metrics e.g. MI or CQI can be used for intra-CC CRI selection without significantly increasing the computation complexity.

Figure 3:
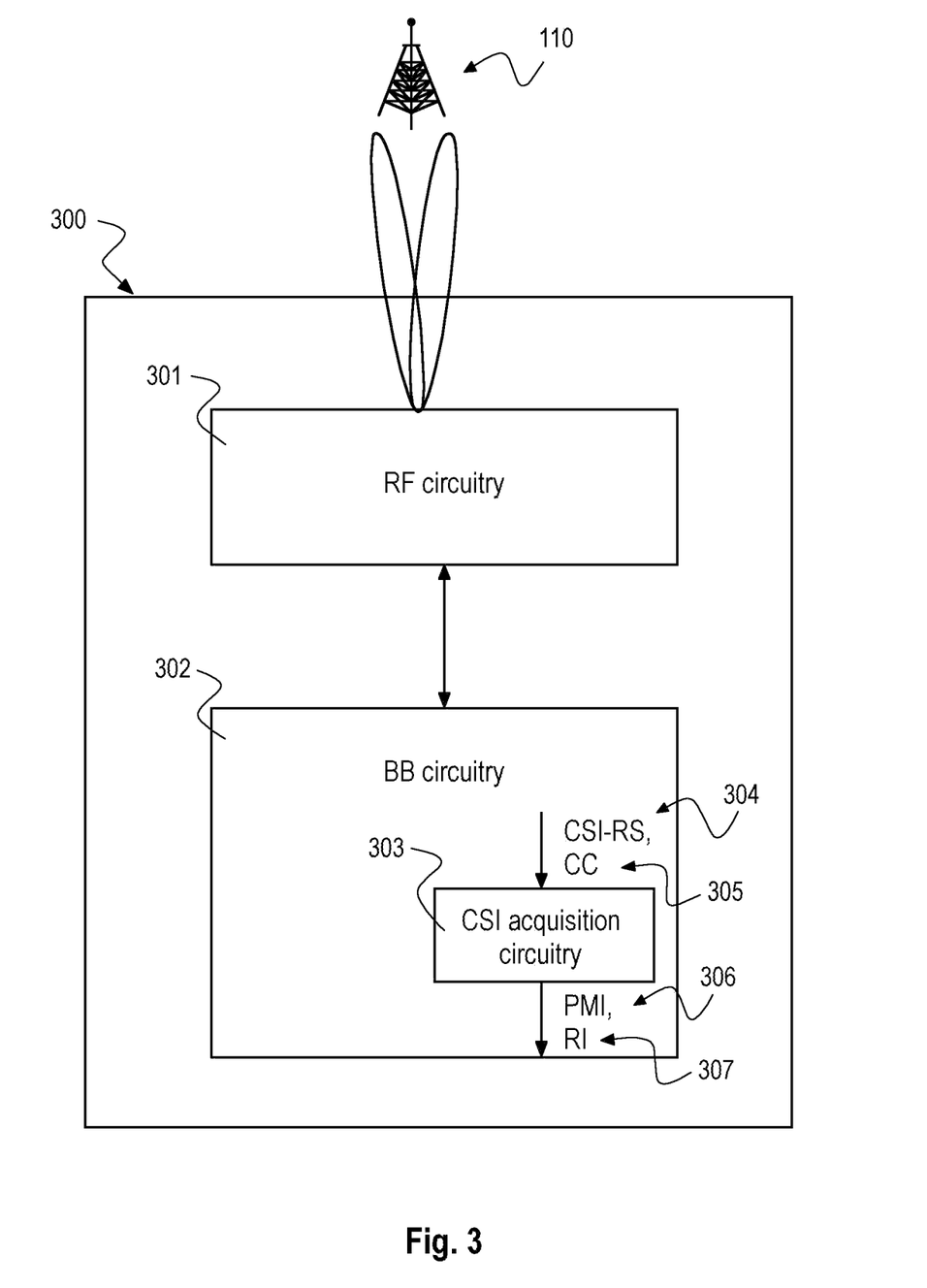
FIG. 3 is a block diagram of an exemplary user equipment circuitry 300 including a CSI acquisition circuitry 303 according to the disclosure.

FIG. 3 is a block diagram of an exemplary user equipment circuitry 300 including a CSI acquisition circuitry 303 according to the disclosure. The CSI acquisition circuitry 303 is configured to perform CSI acquisition, i.e., based on channel and noise observation from a CSI-RS resource, to detect the optimal RI and PMI combination associated to that CSI-RS resource.

The UE circuitry 300 may be implemented in one or both of the UEs 101, 102 described above with respect to FIG. 1. The UE circuitry 300 includes a radio frequency (RF) circuitry 301 for receiving beamformed radio signals from a gNB or base station 110 and a baseband (BB) circuitry 302 coupled by an interface to the RF circuitry 301 to process the radio signals in baseband. The BB circuitry 302 includes a CSI acquisition circuitry 303 receiving CSI-RS resources 304 for component carriers (CCs) 305 and providing optimized PMI 306 and RI 307 values.

The CSI acquisition circuitry 303 is configured to: determine at least one channel covariance matrix estimate and interference-and-noise covariance matrix estimate based on at least one channel state information reference signal, CSI-RS, resource 304; select a restricted number of rank indicator, RI, hypotheses from a set of RI hypotheses for running a joint rank indicator-precoding matrix indicator, RI-PMI, search on the CSI-RS based channel covariance matrix estimate and interference-and-noise covariance matrix estimate to select an optimal RI value and associated PMI value, wherein the restricted number of RI hypotheses is in accordance with a run-time estimated CSI acquisition capability (also referred to as computation budget) of the CSI acquisition circuitry; and run the joint RI-PMI search based on the selected RI hypotheses. The RI-PMI search results in optimized PMI 306 and RI 307 values. The RI-PMI search may be performed by the RI-PMI algorithm as described above.

The CSI acquisition circuitry may determine the channel covariance matrix estimate and interference-and-noise covariance matrix estimate for at least one downlink component carrier, DL CC, 305 based on at least one CSI-RS resource 304 associated with the at least one DL CC 305.

The CSI acquisition circuitry 303 may determine channel parameter estimates associated to a specific CSI-RS resource 304 of a specific DL CC 305 based on the CSI-RS resource or based on one of a demodulation reference signal, DMRS, a synchronization signal block, SSB, resource or a different CSI-RS resource that is quasi co-located with the CSI-RS resource 304, wherein the channel parameter estimates comprise at least delay spread estimation and signal-to-interference and noise, SINR, estimation.

The CSI acquisition circuitry 303 may down-sample frequency domain CSI-RS resource elements within at least one CSI-RS resource 304; and determine the channel covariance matrix estimate and interference-and-noise covariance matrix estimate based on the down-sampled resource elements, e.g. according to step (2) described above with respect to FIG. 2.

The CSI acquisition circuitry 303 may determine a down-sampling ratio for the down-sampling based on a delay spread estimation of the channel and apply that ratio to the downsampling of CSI-RS resource elements in the frequency domain.

The CSI acquisition circuitry 303 may determine a signal-to-interference plus noise ratio, SINR, estimate of the channel; and eliminate unrealistic RI hypotheses from the set of RI hypotheses based on the SINR estimate, e.g. according to step (3) described above with respect to FIG. 2.

The CSI acquisition circuitry 303 may determine an RI confidence metric for each RI hypothesis of the set of RI hypotheses based on Eigenvalue Decomposition, EVD, of the CSI-RS based channel covariance matrix estimate, e.g. according to step (5) described above with respect to FIG. 2.

The CSI acquisition circuitry 303 may determine the RI confidence metric based a distance measure with respect to Eigenvalues derived from the EVD and optimal Eigenvalues associated with the respective RI hypothesis, e.g. as described above with respect to step (5) of FIG. 2.

The CSI acquisition circuitry 303 may determine the optimal Eigenvalues associated with the respective RI hypothesis based on a number of transmit antenna ports and a number of receive antenna ports, e.g. as described above with respect to step (5) of FIG. 2.

The CSI acquisition circuitry 303 may select the restricted number of RI hypotheses from the set of RI hypotheses based on the RI confidence metrics of the RI hypotheses, e.g. as described above with respect to step (6) of FIG. 2.

The CSI acquisition circuitry may select the restricted number of RI hypotheses based on component carrier, CC, priority information 203, e.g. as described above with respect to step (9) of FIG. 2.

The CC priority information may be based on CC types, load conditions of the CCs, system bandwidth of a CC, bandwidth of allocated bandwidth part, BWP, of the CC, carrier band index of the CC and/or uplink control information, UCI, priority rules, e.g. as described above with respect to step (9) of FIG. 2.

The CSI acquisition circuitry 303 may determine the CSI acquisition capability based on baseband processing capability and CSI resource property. The CSI acquisition circuitry 303 may determine the baseband processing capability based on processor clock rate of the CSI acquisition circuitry and number of joint PMI-RI search related operations that can be processed per clock cycle. The CSI acquisition circuitry 303 may determine the CSI resource property based on number of down-sampled frequency domain CSI-RS resource elements, number of TX antenna ports of the CSI-RS resources, number of RX antenna ports for receiving the CSI-RS resources and time duration within which the CSI acquisition must be finished and a CQI report has to be generated. The CSI acquisition circuitry 303 may determine the CSI acquisition capability (M) in terms of total number of RI hypotheses that the CSI acquisition circuitry can support for joint RI-PMI search, e.g. as described above with respect to step (8) of FIG. 2; or determine the CSI acquisition capability (M) in terms of a function of the total number of RI-PMI hypotheses combinations that the CSI acquisition circuitry can support for joint RI-PMI search, e.g. as described above with respect to step (8) of FIG. 2.

The CSI acquisition circuitry 303 may determine a channel quality indicator, CQI, based on finally selected RI and PMI of the joint RI-PMI search per component carrier 305; and may generate a CSI feedback report based on the CQI as well as the final selected RI and PMI values per component carrier 305, e.g. as described above with respect to step (11) of FIG. 2.

Figure 4:
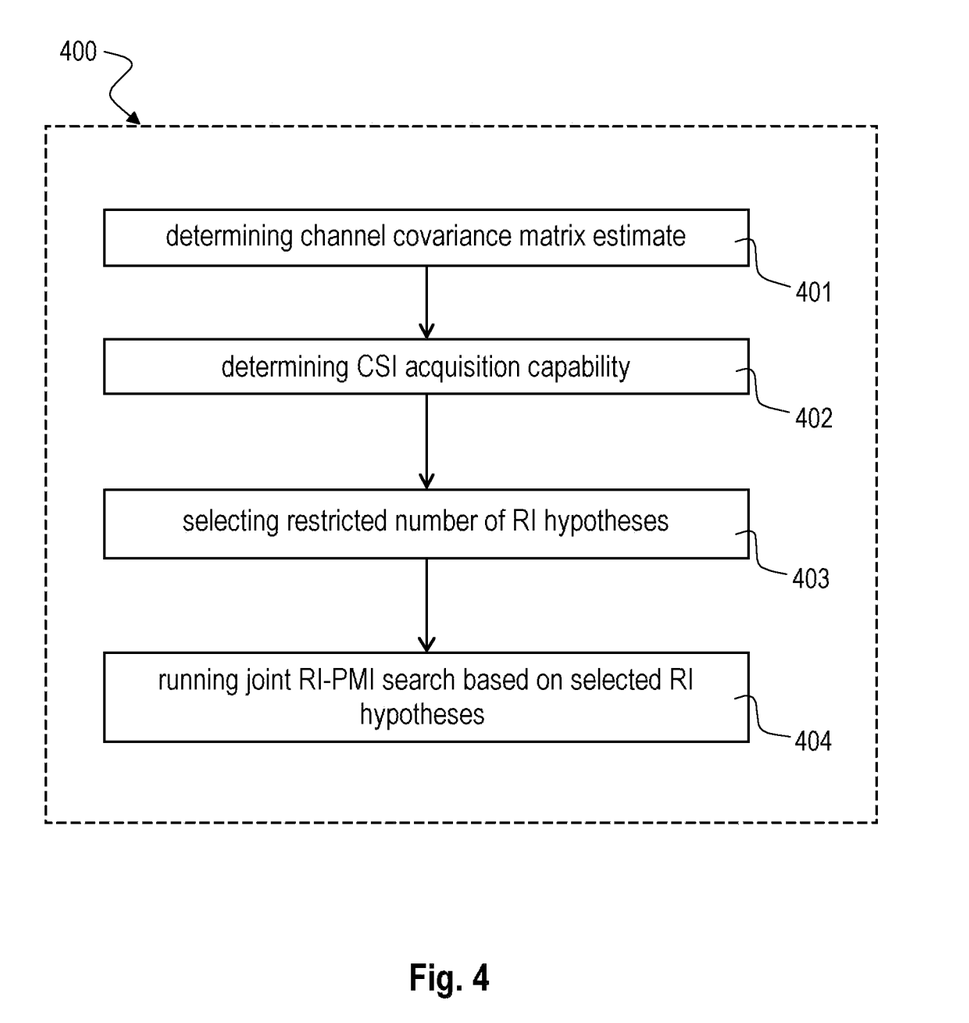
FIG. 4 is a schematic diagram illustrating a method 400 for CSI acquisition 400 according to the disclosure.

FIG. 4 is a schematic diagram illustrating a method 400 for CSI acquisition 400 according to the disclosure.

The method 400 comprises determining 401 a channel covariance matrix estimate and interference-and-noise covariance matrix estimate based on at least one channel state information reference signal, CSI-RS, resource, e.g. as described above with respect to FIGS. 2 and 3. The method 400 comprises determining 402 CSI acquisition capability. "CSI acquisition capability" is the number of RI hypotheses and the associated PMI hypotheses that can be tested by joint RI-PMI search within a pre-defined time-window. For example, it can be determined by baseband processing capability and CSI-RS resource property. The baseband processing capability can further be determined by the baseband processor clock rate and the number of joint PMI-RI search related operations that can be processed per clock cycle; The CSI-RS resource property can further be determined by the number of adaptive down-sampled resource elements and number of TX antenna ports of the CSI-RS resources, and by number of RX antenna ports for receiving the CSI-RS resource.

The method 400 comprises selecting 403 a restricted number of rank indicator, RI, hypotheses from a set of RI hypotheses for running a joint rank indicator-precoding matrix indicator, RI-PMI, search on the CSI-RS based channel covariance matrix estimate and interference-and-noise covariance matrix estimate to select an optimal RI value and associated PMI value, wherein the restricted number of RI hypotheses is in accordance with a run-time estimated CSI acquisition capability of the CSI acquisition circuitry, as determined by above described block 402 or as described above with respect to FIGS. 2 and 3, for example.

The method 400 further comprises running 404 the joint RI-PMI search based on the selected RI hypotheses, e.g. as described above with respect to FIGS. 2 and 3.

The method 400 may further comprise: determining the channel covariance matrix estimate and interference-and-noise covariance matrix estimate for at least one downlink component carrier, DL CC, based on at least one CSI-RS resource associated with the at least one DL CC.

The method 400 may further comprise: determining channel parameter estimates associated to a specific CSI-RS resource of a specific DL CC based on the CSI-RS resource or based on one of a demodulation reference signal, DMRS, a synchronization signal block, SSB, resource or a different CSI-RS resource that is quasi co-located with the CSI-RS resource, wherein the channel parameter estimates comprise at least delay spread estimation and signal-to-interference and noise, SINR, estimation.

The method 400 may further comprise: down-sampling the at least one CSI-RS resource; and determining the channel covariance matrix estimate and interference-and-noise covariance matrix estimate based on the at least one down-sampled CSI-RS resource, e.g. as described above with respect to FIGS. 2 and 3.

The methods, devices and systems described in this disclosure may be implemented as Digital Signal Processors (DSP), micro-controllers or any other side-processor or hardware circuit on a chip or an application specific integrated circuit (ASIC). Aspects described in this disclosure can be implemented in digital electronic circuitry, or in computer hardware, firmware, software, or in combinations thereof, e.g. in available hardware of mobile devices or in new hardware dedicated for processing the methods described herein.

The present disclosure also supports a computer program product including computer executable code or computer executable instructions that, when executed, causes at least one computer to execute the performing and computing blocks described herein, in particular the method described above with respect to FIG. 4. Such a computer program product may include a non-transient readable storage medium storing program code thereon for use by a processor, the program code comprising instructions for performing the methods or the computing blocks as described above.

Examples

The following examples pertain to further aspects. Example 1 is a channel state information, CSI, acquisition circuitry, configured to: determine at least one channel covariance matrix estimate and interference-and-noise covariance matrix estimate based on at least one channel state information reference signal, CSI-RS, resource; select a restricted number of rank indicator, RI, hypotheses from a set of RI hypotheses for running a joint rank indicator-precoding matrix indicator, RI-PMI, search on the CSI-RS based channel covariance matrix estimate and interference-and-noise covariance matrix estimate to select an optimal RI value and associated PMI value, wherein the restricted number of RI hypotheses is in accordance with a run-time estimated CSI acquisition capability of the CSI acquisition circuitry; and run the joint RI-PMI search based on the selected RI hypotheses. The CSI acquisition circuitry is configured to perform CSI acquisition, i.e., based on channel and noise observation from a CSI-RS resource, to detect the optimal RI and PMI combination associated to that CSI-RS resource. CSI acquisition capability is the number of RI hypotheses and the associated PMI hypotheses that can be tested by joint RI-PMI search within a pre-defined time window.

In Example 2, the subject matter of Example 1 can optionally include that the CSI acquisition circuitry is configured to: determine the CSI acquisition capability based on baseband processing capability and CSI resource property, determine the baseband processing capability based on processor clock rate of the CSI acquisition circuitry and number of joint PMI-RI search related operations that can be processed per clock cycle, determine the CSI resource property based on number of down-sampled frequency domain CSI-RS resource elements, number of TX antenna ports of the CSI-RS resources, number of RX antenna ports for receiving the CSI-RS resources and time duration within which the CSI acquisition must be finished and a CQI report has to be generated.

In Example 3, the subject matter of Example 2 can optionally include that the CSI acquisition circuitry is configured to: determine the CSI acquisition capability in terms of total number of RI hypotheses that the CSI acquisition circuitry can support for the joint RI-PMI search; or determine the CSI acquisition capability in terms of total number of RI-PMI hypothesis combinations that CSI acquisition circuitry can support for joint RI-PMI search.

In Example 4, the subject matter of Example 1 can optionally include that the CSI acquisition circuitry is configured to determine the channel covariance matrix estimate and interference-and-noise covariance matrix estimate for at least one downlink component carrier, DL CC, based on at least one CSI-RS resource associated with the at least one DL CC.

In Example 5, the subject matter of any one of Examples 1-2 can optionally include that the CSI acquisition circuitry is configured to determine channel parameter estimates associated to a specific CSI-RS resource of a specific DL CC based on the CSI-RS resource or based on one of a demodulation reference signal, DMRS, a synchronization signal block, SSB, resource or a different CSI-RS resource that is quasi co-located with the CSI-RS resource, wherein the channel parameter estimates comprise at least delay spread estimation and signal-to-interference and noise, SINR, estimation.

In Example 6, the subject matter of any one of Examples 1-2 can optionally include that the CSI acquisition circuitry is configured to: down-sample frequency domain CSI-RS resource elements within at least one CSI-RS resource; and determine the channel covariance matrix estimate and interference-and-noise covariance matrix estimate based on the down-sampled resource elements.

In Example 7, the subject matter of Example 6 can optionally include that the CSI acquisition circuitry is configured to determine a down-sampling ratio for the down-sampling based on a delay spread estimation of the channel which is associated to the CSI-RS resource.

In Example 8, the subject matter of any one of Examples 1-2 can optionally include that the CSI acquisition circuitry is configured to: determine a signal-to-interference plus noise ratio, SINR, estimate of the channel; and eliminate unrealistic RI hypotheses from the set of RI hypotheses based on the SINR estimate.

In Example 9, the subject matter of any one of Examples 1-2 can optionally include that the CSI acquisition circuitry is configured to determine an RI confidence metric for each RI hypothesis of the set of RI hypotheses based on Eigenvalue Decomposition, EVD, of the CSI-RS based channel covariance matrix estimate.

In Example 10, the subject matter of Example 9 can optionally include that the CSI acquisition circuitry is configured to determine the RI confidence metric based a distance measure with respect to Eigenvalues derived from the EVD and optimal Eigenvalues associated with the respective RI hypothesis.

In Example 11, the subject matter of Example 10 can optionally include that the CSI acquisition circuitry is configured to determine the optimal Eigenvalues associated with the respective RI hypothesis based on a number of transmit antenna ports and a number of receive antenna ports.

In Example 12, the subject matter of Example 9 can optionally include that the CSI acquisition circuitry is configured to select the restricted number of RI hypotheses from the set of RI hypotheses based on the RI confidence metrics of the RI hypotheses.

In Example 13, the subject matter of Example 12 can optionally include that the CSI acquisition circuitry is configured to select the restricted number of RI hypotheses based on component carrier, CC, priority information of a CC which is associated to the RI hypotheses, e.g. a DL CC which carriers the CSI-RS resource for CSI acquisition.

In Example 14, the subject matter of Example 13 can optionally include that the CC priority information is based on CC types, load conditions of the CCs, system bandwidth of a CC, bandwidth of allocated bandwidth part, BWP, of the CC, carrier band index of the CC and/or uplink control information, UCI, priority rules. The load conditions of the CCs may be determined by Reference Signal Received Quality, RSRQ, measurements, for example.

In Example 15, the subject matter of any one of Examples 1-2 can optionally include that the CSI acquisition circuitry is configured to: determine a channel quality indicator, CQI, based on finally selected RI and PMI of the joint RI-PMI search per component carrier; and generate a CSI feedback report based on the CQI and its associated finally selected RI and PMI values per component carrier; and report the selected RI and PMI to the network.

Example 16 is a baseband processor, comprising a channel state information, CSI, acquisition circuitry, wherein the CSI acquisition circuitry is configured to: determine at least one channel covariance matrix estimate and interference-and-noise covariance matrix estimate for at least one downlink component carrier, DL CC, based on at least one channel state information reference signal, CSI-RS, resource associated with the at least one DL CC; select a restricted number of rank indicator, RI, hypotheses from a set of RI hypotheses for running a joint rank indicator-precoding matrix indicator, RI-PMI, search on the CSI-RS based channel covariance matrix estimate and interference-and-noise covariance matrix estimate for all DL CCs to select an optimal RI value and associated PMI value, wherein the restricted number of RI hypotheses is in accordance with a run-time estimated CSI acquisition capability of the CSI acquisition circuitry; and run the joint RI-PMI search based on the selected RI hypotheses.

In Example 17, the subject matter of Example 16 can optionally include that the CSI acquisition circuitry is configured to determine the channel covariance matrix estimate and interference-and-noise covariance matrix estimate based on channel parameter estimates associated to CSI-RS resources of DL CCs, wherein the channel parameter estimates comprise at least delay spread estimation and signal-to-interference and noise, SINR, estimation.

In Example 18, the subject matter of any one of Examples 16-17 can optionally include that the CSI acquisition circuitry is configured to down-sample frequency domain CSI-RS resource elements within at least one CSI-RS resource and to determine the channel covariance matrix estimate and interference-and-noise covariance matrix estimate based on the down-sampled resource elements.

In Example 19, the subject matter of any one of Examples 15-16 can optionally include that the CSI acquisition circuitry is configured to down-sample frequency domain CSI-RS resource elements within at least one CSI-RS resource by using a down-sampling ratio that is based on a delay spread estimation of the channel.

In Example 20, the subject matter of any one of Examples 16-17 can optionally include that the CSI acquisition circuitry is configured to determine a signal-to-interference plus noise ratio, SINR, estimate of the channel and eliminate unrealistic RI hypotheses from the set of RI hypotheses based on the SINR estimate.

In Example 21, the subject matter of any one of Examples 16-17 can optionally include that the CSI acquisition circuitry is configured to determine an RI confidence metric for each RI hypothesis of the set of RI hypotheses based on Eigenvalue Decomposition, EVD, of the CSI-RS based channel covariance matrix estimate.

In Example 22, the subject matter of Example 21 can optionally include that the CSI acquisition circuitry is configured to determine the RI confidence metric based a distance measure with respect to Eigenvalues derived from the EVD and optimal Eigenvalues associated with the respective RI hypothesis.

In Example 23, the subject matter of Example 22 can optionally include that the CSI acquisition circuitry is configured to determine the optimal Eigenvalues associated with the respective RI hypothesis based on a number of transmit antenna ports and a number of receive antenna ports.

In Example 24, the subject matter of Example 21 can optionally include that the CSI acquisition circuitry is configured to select the restricted number of RI hypotheses from the set of RI hypotheses based on the RI confidence metrics of the RI hypotheses.

In Example 25, the subject matter of any one of Examples 16-17 can optionally include that the CSI acquisition circuitry is configured to select the restricted number of RI hypotheses based on CC priority information.

In Example 26, the subject matter of Example 25 can optionally include that the CC priority information is based on CC types, load conditions of the CCs, system bandwidth of a CC, bandwidth of allocated bandwidth part, BWP, of the CC, carrier band index of the CC and/or uplink control information, UCI, priority rules.

In Example 27, the subject matter of any one of Examples 16-17 can optionally include that the CSI acquisition circuitry is configured to determine a channel quality indicator, CQI, based on finally selected RI and PMI of the joint RI-PMI search per DL CC and to generate a CSI feedback report based on the CQI, RI and PMI per DL CC.

In Example 28, the subject matter of any one of Examples 16-17 can optionally include that the CSI acquisition circuitry is configured to determine the CSI acquisition capability based on baseband processing capability and CSI resource property, determine the baseband processing capability based on processor clock rate of the CSI acquisition circuitry and number of joint PMI-RI search related operations that can be processed per clock cycle, determine the CSI resource property based on number of down-sampled frequency domain CSI-RS resource elements, number of TX antenna ports of the CSI-RS resources, number of RX antenna ports for receiving the CSI-RS resources and time duration within which the CSI acquisition must be finished and a CQI report has to be generated.

Example 29 is a method for channel state information, CSI, acquisition, the method comprising: determining a channel covariance matrix estimate and interference-and-noise covariance matrix estimate based on at least one channel state information reference signal, CSI-RS, resource; selecting a restricted number of rank indicator, RI, hypotheses from a set of RI hypotheses for running a joint rank indicator-precoding matrix indicator, RI-PMI, search on the CSI-RS based channel covariance matrix estimate and interference-and-noise covariance matrix estimate to select an optimal RI value and associated PMI value, wherein the restricted number of RI hypotheses is in accordance with a run-time estimated CSI acquisition capability of the CSI acquisition circuitry; and running the joint RI-PMI search based on the selected RI hypotheses.

In Example 30, the subject matter of Example 29 can optionally include: determining the channel covariance matrix estimate and interference-and-noise covariance matrix estimate for at least one downlink component carrier, DL CC, based on at least one CSI-RS resource associated with the at least one DL CC.

In Example 31, the subject matter of any one of Examples 29-30 can optionally include: determining channel parameter estimates associated to a specific CSI-RS resource of a specific DL CC based on the CSI-RS resource or based on one of a demodulation reference signal, DMRS, a synchronization signal block, SSB, resource or a different CSI-RS resource that is quasi co-located with the CSI-RS resource, wherein the channel parameter estimates comprise at least delay spread estimation and signal-to-interference and noise, SINR, estimation.

In Example 32, the subject matter of any one of Examples 29-30 can optionally include: down-sampling the at least one CSI-RS resource; and determining the channel covariance matrix estimate and interference-and-noise covariance matrix estimate based on the at least one down-sampled CSI-RS resource.

In Example 33, the subject matter of Example 32 can optionally include determining a down-sampling ratio for the down-sampling based on a delay spread estimation of the channel.

In Example 34, the subject matter of any one of Examples 29-30 can optionally include: determining a signal-to-interference plus noise ratio, SINR, estimate of the channel; and eliminating unrealistic RI hypotheses from the set of RI hypotheses based on the SINR estimate.

In Example 35, the subject matter of any one of Examples 29-30 can optionally include: determining an RI confidence metric for each RI hypothesis of the set of RI hypotheses based on Eigenvalue Decomposition, EVD, of the CSI-RS based channel covariance matrix estimate.

In Example 36, the subject matter of Example 35 can optionally include: determining the RI confidence metric based a distance measure with respect to Eigenvalues derived from the EVD and optimal Eigenvalues associated with the respective RI hypothesis.

In Example 37, the subject matter of Example 36 can optionally include: determining the optimal Eigenvalues associated with the respective RI hypothesis based on a number of transmit antenna ports and a number of receive antenna ports.

In Example 38, the subject matter of Example 35 can optionally include: selecting the restricted number of RI hypotheses from the set of RI hypotheses based on the RI confidence metrics of the RI hypotheses.

In Example 39, the subject matter of Example 38 can optionally include: selecting the restricted number of RI hypotheses based on component carrier, CC, priority information.

In Example 40, the subject matter of Example 39 can optionally include that the CC priority information is based on CC types, load conditions of the CCs, system bandwidth of a CC, bandwidth of allocated bandwidth part, BWP, of the CC, carrier band index of the CC and/or uplink control information, UCI, priority rules.

In Example 41, the subject matter of Example 32 can optionally include: determining the computation budget in terms of total number of RI hypotheses that the CSI acquisition circuitry can support for joint RI-PMI search; or determining the CSI acquisition capability in terms of a function of a number of down-sampled resource elements within CSI-RS resources, number of RI hypotheses to test and number of PMI hypotheses per RI hypothesis.

In Example 42, the subject matter of any one of Examples 29-30 can optionally include: determining a channel quality indicator, CQI, based on finally selected RI and PMI of the joint RI-PMI search per component carrier; and generating a CSI feedback report based on the CQI per component carrier.

In Example 43, the subject matter of any one of Examples 29-30 can optionally include: determining the CSI acquisition capability based on baseband processing capability and CSI resource property; determining the baseband processing capability based on processor clock rate of the CSI acquisition circuitry and number of joint PMI-RI search related operations that can be processed per clock cycle; and determining the CSI resource property based on number of down-sampled resource elements, number of TX antenna ports of the CSI-RS resources, number of RX antenna ports for receiving the CSI-RS resources and time duration within which the CSI acquisition must be finished and a CQI report has to be generated.

Example 44 is a baseband processing system, comprising: a channel state information, CSI, acquisition subsystem, configured to: determine at least one channel covariance matrix estimate and interference-and-noise covariance matrix estimate for at least one downlink component carrier, DL CC, based on at least one channel state information reference signal, CSI-RS, resource associated with the at least one DL CC; select a restricted number of rank indicator, RI, hypotheses from a set of RI hypotheses for running a joint rank indicator-precoding matrix indicator, RI-PMI, search on the CSI-RS based channel covariance matrix estimate and interference-and-noise covariance matrix estimate for all DL CCs to select an optimal RI value and associated PMI value, wherein the restricted number of RI hypotheses is in accordance with a run-time estimated CSI acquisition capability of the CSI acquisition circuitry; execute the joint RI-PMI search based on the selected RI hypotheses; determine a channel quality indicator, CQI, based on finally selected RI and PMI of the joint RI-PMI search per DL CC; and a CSI reporting subsystem, configured to: generate a CSI feedback report based on the CQI, RI and PMI per DL CC.

In Example 45, the subject matter of Example 44 can optionally include that the CSI acquisition subsystem is configured to determine an RI confidence metric for each RI hypothesis of the set of RI hypotheses based on Eigenvalue Decomposition, EVD, of the CSI-RS based channel covariance matrix estimate.

Example 46 is a device for channel state information, CSI, acquisition, the device comprising: means for determining a channel covariance matrix estimate and interference-and-noise covariance matrix estimate based on at least one channel state information reference signal, CSI-RS, resource; means for selecting a restricted number of rank indicator, RI, hypotheses from a set of RI hypotheses for running a joint rank indicator-precoding matrix indicator, RI-PMI, search on the CSI-RS based channel covariance matrix estimate and interference-and-noise covariance matrix estimate to select an optimal RI value and associated PMI value, wherein the restricted number of RI hypotheses is in accordance with a run-time estimated CSI acquisition capability of the CSI acquisition circuitry; and means for running the joint RI-PMI search based on the selected RI hypotheses.

In Example 47, the subject matter of Example 46 can optionally include means for determining the channel covariance matrix estimate and interference-and-noise covariance matrix estimate for at least one downlink component carrier, DL CC, based on at least one CSI-RS resource associated with the at least one DL CC.

Example 48 is a computer readable non-transitory medium on which computer instructions are stored which when executed by a computer cause the computer to perform the method of any one of Examples 29 to 43.

Example 49 is a baseband circuitry, configured to: determine at least one channel covariance matrix estimate and interference-and-noise covariance matrix estimate based on at least one channel state information reference signal, CSI-RS, resource; select a restricted number of rank indicator, RI, hypotheses from a set of RI hypotheses for running a joint rank indicator-precoding matrix indicator, RI-PMI, search on the CSI-RS based channel covariance matrix estimate and interference-and-noise covariance matrix estimate to select an optimal RI value and associated PMI value, wherein the restricted number of RI hypotheses is in accordance with a run-time estimated CSI acquisition capability of the baseband circuitry; and execute the joint RI-PMI search based on the selected RI hypotheses.

In Example 50, the subject matter of Example 49 can optionally include that the baseband circuitry is configured to: determine the CSI acquisition capability based on baseband processing capability and CSI resource property, determine the baseband processing capability based on processor clock rate of the baseband circuitry and number of joint PMI-RI search related operations that can be processed per clock cycle, determine the CSI resource property based on number of down-sampled frequency domain CSI-RS resource elements, number of TX antenna ports of the CSI-RS resources, number of RX antenna ports for receiving the CSI-RS resources and time duration within which the CSI acquisition must be finished and a CQI report has to be generated.

In addition, while a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

The invention claimed is:

1. A channel state information (CSI) acquisition circuitry, configured to:
   determine at least one channel covariance matrix estimate and interference-and-noise covariance matrix estimate based on at least one channel state information reference signal (CSI-RS) resource;
   select a restricted number of rank indicator (RI) hypotheses from a set of RI hypotheses for running a joint rank indicator-precoding matrix indicator (RI-PMI) search on the CSI-RS based channel covariance matrix estimate and interference-and-noise covariance matrix estimate to select an optimal RI value and associated PMI value, wherein the restricted number of RI hypotheses is in accordance with a run-time estimated CSI acquisition capability of the CSI acquisition circuitry; and
   execute the joint RI-PMI search based on the selected RI hypotheses.

2. The CSI acquisition circuitry of claim 1, configured to:
   determine the CSI acquisition capability based on a baseband processing capability and a CSI resource property,
   determine the baseband processing capability based on a processor clock rate of the CSI acquisition circuitry and a number of joint RI-PMI search related operations that can be processed per clock cycle,
   determine the CSI resource property based on number of down-sampled frequency domain CSI-RS resource elements, number of TX antenna ports of the CSI-RS resources, number of receive (RX) antenna ports for receiving the CSI-RS resources and time duration within which the CSI acquisition must be finished and a Channel Quality Indicator (CQI) report has to be generated.

3. The CSI acquisition circuitry of claim 2, configured to:
   determine the CSI acquisition capability in terms of a total number of RI hypotheses that the CSI acquisition circuitry can support for the joint RI-PMI search; or
   determine the CSI acquisition capability in terms of a total number of RI PMI hypothesis combinations that the CSI acquisition circuitry can support for the joint RI-PMI search.

4. The CSI acquisition circuitry of claim 1, configured to:
   determine the channel covariance matrix estimate and interference-and-noise covariance matrix estimate for at least one downlink component carrier (DL CC) based on at least one CSI-RS resource associated with the at least one DL CC.

5. The CSI acquisition circuitry of claim 1, configured to:
   determine channel parameter estimates associated to a specific CSI-RS resource of a specific DL CC based on the CSI-RS resource or based on one of a demodulation reference signal (DMRS), a synchronization signal block (SSB) resource, or a different CSI-RS resource that is quasi co-located with the CSI-RS resource,
   wherein the channel parameter estimates comprise at least a delay spread estimation and a signal-to-interference and noise (SINR) estimation.

6. The CSI acquisition circuitry of claim 1, configured to:
   down-sample frequency domain CSI-RS resource elements within at least one CSI-RS resource; and
   determine the channel covariance matrix estimate and interference-and-noise covariance matrix estimate based on the down-sampled resource elements.

7. The CSI acquisition circuitry of claim 6, configured to:
   determine a down-sampling ratio for the down-sampling based on a delay spread estimation of the channel which is associated to the CSI-RS resource.

8. The CSI acquisition circuitry of claim 1, configured to:
   determine a signal-to-interference plus noise ratio (SINR) estimate of the channel; and
   eliminate RI hypotheses from the set of RI hypotheses based on the SINR estimate.

9. The CSI acquisition circuitry of claim 1, configured to:
   determine an RI confidence metric for each RI hypothesis of the set of RI hypotheses based on Eigenvalue Decomposition (EVD) of the CSI-RS based channel covariance matrix estimate.

10. The CSI acquisition circuitry of claim 9, configured to:
    determine the RI confidence metric based a distance measure with respect to Eigenvalues derived from the EVD and optimal Eigenvalues associated with the respective RI hypothesis.

11. The CSI acquisition circuitry of claim 10, configured to:
    determine the optimal Eigenvalues associated with the respective RI hypothesis based on a number of transmit antenna ports and a number of receive antenna ports.

12. The CSI acquisition circuitry of claim 9, configured to:
    select the restricted number of RI hypotheses from the set of RI hypotheses based on the RI confidence metrics of the RI hypotheses.

13. The CSI acquisition circuitry of claim 12, configured to:

select the restricted number of RI hypotheses based on component carrier (CC) priority information of a CC which is associated to the RI hypotheses.

14. A method for channel state information (CSI) acquisition, the method comprising:
- determining a channel covariance matrix estimate and interference-and-noise covariance matrix estimate based on at least one channel state information reference signal (CSI-RS) resource;
- selecting a restricted number of rank indicator (RI) hypotheses from a set of RI hypotheses for running a joint rank indicator-precoding matrix indicator (RI-PMI) search on the CSI-RS based channel covariance matrix estimate and interference-and-noise covariance matrix estimate to select an optimal RI value and associated PMI value, wherein the restricted number of RI hypotheses is in accordance with a run-time estimated CSI acquisition capability of a CSI acquisition circuitry; and
- executing the joint RI-PMI search based on the selected RI hypotheses.

15. The method of claim 14, comprising:
- determining the channel covariance matrix estimate and interference-and-noise covariance matrix estimate for at least one downlink component carrier (DL CC) based on at least one CSI-RS resource associated with the at least one DL CC.

16. The method of claim 14, comprising:
- determining channel parameter estimates associated to a specific CSI-RS resource of a specific DL CC based on the CSI-RS resource or based on one of a demodulation reference signal (DMRS) a synchronization signal block (SSB) resource, or a different CSI-RS resource that is quasi co-located with the CSI-RS resource,
- wherein the channel parameter estimates comprise at least delay spread estimation and signal-to-interference and noise (SINR), SINR, estimation.

17. A baseband processing system, comprising:
a channel state information (CSI) acquisition subsystem, configured to:
- determine at least one channel covariance matrix estimate and interference-and-noise covariance matrix estimate for at least one downlink component carrier (DL CC) based on at least one channel state information reference signal (CSI-RS) resource associated with the at least one DL CC;
- select a restricted number of rank indicator (RI) hypotheses from a set of RI hypotheses for running a joint rank indicator-precoding matrix indicator (RI-PMI) search on the CSI-RS based channel covariance matrix estimate and interference-and-noise covariance matrix estimate for all DL CCs to select an optimal RI value and associated PMI value, wherein the restricted number of RI hypotheses is in accordance with a run-time estimated CSI acquisition capability of the CSI acquisition circuitry;
- execute the joint RI-PMI search based on the selected RI hypotheses;
- determine a channel quality indicator (COI) based on selected RI and PMI of the joint RI-PMI search per DL CC; and a CSI reporting subsystem, configured to:
- generate a CSI feedback report based on the CQI per DL CC.

18. The baseband processing system of claim 17,
- wherein the CSI acquisition subsystem is configured to determine an RI confidence metric for each RI hypothesis of the set of RI hypotheses based on Eigenvalue Decomposition (EVD) of the CSI-RS based channel covariance matrix estimate.

* * * * *